United States Patent Office 3,463,753
Patented Aug. 26, 1969

3,463,753
TERPENE-URETHANE RESINS
Carlos T. Gonzenbach, Scotia, and Manuel A. Jordan, Schenectady, N.Y., assignors to Schenectady Chemicals, Inc., Schenectady, N.Y., a corporation of New York
No Drawing. Filed Mar. 23, 1966, Ser. No. 536,642
Int. Cl. C09j 3/26
U.S. Cl. 260—27   17 Claims

ABSTRACT OF THE DISCLOSURE

A hot melt adhesive composition is prepared from paraffin wax or microcrystalline wax and the reaction product of an organic polyisocyanate and a terpene alcohol. Preferably there is added an ethylene-vinyl acetate copolymer.

---

The present invention relates to novel hot melt waxes and adhesives.

It is an object of the present invention to prepare novel hot melt adhesives and waxes.

Another object is to prepare hot melt adhesives which have increased shear strength, e.g., in paper-to-paper adhesion than regular terpene containing adhesives.

An additional object is to prepare low color, high gloss, hot melt adhesives.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found tht these objects can be obtained by preparing hot melt adhesives including certain modified urethanes.

The modified urethanes of the present invention are prepared by reacting an organic polyisocyanate with a terpene alcohol. A portion of the terpene alcohol can be replaced by a polyhydric alcohol. Thus, 10 to 100% of the available alcohol groups for reacting with the polyisocyanate can be supplied by the terpene alcohol, the balance being provided by the polyhydric alcohol. Preferably, at least 40% of the available alcohol groups are provided by the terpene alcohol, and in one of the preferred aspects of the invention all of the alcohol groups are provided by the terpene alcohol.

There can be used an equivalent ratio of polyisocyanate to alcohol reactants of from 10:1 to 1:5 in preparing the modified urethane resin; preferably, the equivalent ratio is 1:1. As is known in the art, one isocyanate group is equivalent to one alcohol group in forming the urethane.

It is critical that there be used a terpene alcohol in forming the urethane resin since other monohydric alcohols are unsuitable. Thus, for example, the reaction product of 2 moles of tridecanol with one mole of toluene diisocyanate prepared by reacting at a temperature starting at 50° C., followed by an increase to 120° C. and finally heating to 150° C. was a viscous liquid (having a M.P. of about 10° C.) and of very light color (2 Hellige).

As the terpene alcohol there can be used either monoterpene alcohols or diterpene alcohols. As used in the present specification and claims, the term "terpene alcohol" refers to terpenes having a single alcoholic group. There can be used individual terpene alcohols or mixtures of terpene alcohols. The preferred terpene alcohols are cyclic terpene alcohols and the most preferred terpene alcohols are tricyclic diterpene alcohols such as Abitol described in Leclercq Patent 2,867,644 as a mixture of 14 to 23% of abietyl alcohol, 36 to 39% dihydroabietyl alcohol and 39 to 50% of tetrahydroabietyl alcohol.

Examples of suitable terpene alcohols for use in preparing the urethane resins of the present invention are α-terpineol, geraniol, citronellol, rose oil, nerol, abietyl alcohol, dihydroabietyl alcohol, tetrahydroabietyl alcohol, dehydroabietyl alcohol, 2 - hydroxymethyl - 5 - norbornene (Cyclol), 6,6-dimethyl bicyclo (3,1,1)-2-heptene-2-ethanol (Nopol), lavender oil, lavandulol, myrcenol, linalool, β-terpineol, gramma terpineol, dihydro-α-terpineol, menthol, neomenthol, fenchyl alcohol, borneol, isoborneol, eudesmol (a sesquiterpene alcohol), bulnesol, cadinol, calamenol, cedrenol, cedrol, costal, cubelol, elemol, farnesol, guaiol, lanceol, ledol, macrocarpol, nerolidol, partheniol, patchorli alcohol, santalol, sesquibenihol, sesquicryptol, sesquigoyol, torreyol, phytol, sclareol and manool.

As the polyhydric alcohol used as a modifying agent in the urethane forming reaction there can be used trimethylolpropane, trimethylolethane, pentaerythritol, sorbitol, mannitol, 1,2,6-hexanetriol, diethylene glycol, dipropylene glycol, tripropylene glycol, dipentaerythritol, glycerol, glycerinepropylene oxide adduct molecular weight 1,000, 1,2,6-hexanetriol-propylene oxide adduct molecular weight 2400, ethylene glycol, propylene glycol, tetramethylene glycol, tris (dipropylene glycol) phosphite, bis (dipropylene glycol) hydroxypropoxypropane phosphonate, oxypropylated sucrose, oxypropylated glucose, norcamphane diols such as 2,5-norcamphanediol, 2,6-norcamphanediol and 2,7-norcamphanediol.

As the polyisocyanate there can be used toluene diisocyanate, triphenylmethane triisocyanate, Mondur TM), methylene bis (4-phenylisocyanate), hexamethylene diisocyanate, 3,3'-dimethoxy-4,4'-diphenylene diisocyanate, 4 - methoxy - 1,3 - phenylene diisocyanate, poly (phenylmethylene) triisocyanate (PAPI), 4-chloro-1,3-phenylene diisocyanate, 4 - isopropyl-1,3-phenylene diisocyanate, 4-ethoxy-1,3-phenylene diisocyanate, mesitylene diisocyanate, durylene diisocyanate, benzidine diisocyanate, 1,5-naphthalene diisocyanate, toluene-2,4,6-triisocyanate, tritolylmethane triisocyanate, the reaction product of toluene diisocyanate with trimethylol propane at an NCO/OH ratio of 2:1 (Mondur CB).

In addition to the terpene urethane thus prepared from an organic polyisocyanate and a terpene alcohol, with or without a polyhydric alcohol modifier, the hot melt adhesive also includes a wax. The wax component can be a paraffin wax or a microcrystalline wax or any mixture of these waxes.

The terpene-polyurethane can be 5 to 50% of the total adhesive composition and the wax can be 40 to 95% of the composition. Preferably, the terpenepolyurethane is 10 to 45% of the composition and the wax is 45 to 70% of the composition.

There is also preferably employed in the composition an ethylene-vinyl acetate copolymer in an amount of 5 to 35% of the composition. The ethylenevinyl acetate copolymer can be omitted, although this generally reduces the quality of the hot melt adhesive.

A preferred ethylene-vinyl acetate copolymer is Elvax 260 having a vinyl acetate content of 27 to 29% and a melt index of 5 to 7. (It also contains 500 to 1000 p.p.m. of butylated hydroxytoluene, an antioxidant.) There can be used other ethylene-vinyl acetate copolymers having 10 to 60% vinyl acetate, preferably between 17 and 42%.

Unless otherwise indicated, all parts and percentages are by weight.

As the terpene modified urethane resins suitable for making the hot melt adhesives of the invention there can be used the Abitol urethanes of Examples 1 to 4 of Leclercq Patent 2,867,644. Other suitable urethane resins are set forth below.

EXAMPLE 1

Two moles of Abitol were placed in a flask fitted with a mechanical stirrer, thermometer, drying tube and separatory funnel. The Abitol was heated to 100°C. and one mole of toluene diisocyanate (80% 2,4-isomer, 20% 2,6-isomer) was added gradually from the separatory funnel. The reaction temperature was allowed to rise to 160° C. A very viscous material was formed. It was necessary to increase the temperature to 190° C. to render the resin fluid enough to be emptied from the reaction flask. The product had a softening point of 100° C. (B and R) and a 3 color (Hellige scale).

EXAMPLE 2

The procedure of Example 1 was repeated replacing the Abitol with abietyl alcohol to obtain a terpene-urethane resin of similar properties.

EXAMPLE 3

A mixture of 2 moles of Abitol and one mole of trimethylolpropane was placed in the reaction flask. The mixture was heated to 80°C. and 2.5 moles of toluene diisocyanate were gradually added from the separatory funnel. An electric heating mantel was applied to the reaction flask to increase the temperature and maintain a low viscosity for the reactants. The reaction temperature was raised to 185°C. and the resin was then poured out. The polymer had a 122°C. softening point (B and R) and a color of 1 (Hellige scale).

EXAMPLE 4

Two moles of Nopol were reacted with one mole of toluene diisocyanate using the procedure described in Example 1. The reaction was started at 50°C. and allowed to rise to 110°C. The flask was then heated to 190°C. and the resin poured out. The product had a 51°C. softening point (B and R) and a 4 color (Hellige scale).

EXAMPLE 5

Two moles of alpha-terpineol were reacted with one mole of toluene diisocyanate following the same general procedure as in Example 1. The reaction was started at 165°C. and ended at 175°C. A soft resin was obtained.

EXAMPLE 6

Following the procedure of Example 1 there were reacted 1.5 moles of Abitol, 0.5 mole pentaerythritol and 1.75 moles of toluene diisocyanate. 10% ethyl acetate based on the starting materials was included as a solvent. The resin obtained had a softening point of 103°C. (B and R).

EXAMPLE 7

Following the procedure of Example 1 there were reacted 2 moles of Cyclol and one mole of toluene diisocyanate. The resin obtained had a softening point of 76°C. (B and R).

EXAMPLE 8

Following the procedure of Example 1 there were reacted one mole of Abitol and ⅓ mole of triphenylmethane triisocyanate (Mondur TM). The resin obtained had a softening point of 124°C. (B and R).

EXAMPLE 9

Following the procedure of Example 1 there was reacted 2 moles of Nopol, one mole of trimethylolpropane and 2.5 moles of toluene diisocyanate. The resin obtained had a softening point of 117°C. (B and R).

EXAMPLE 10

Two moles of Abitol and one mole of toluene diisocyanate were reacted in a similar manner to Example 1. The final temperature was 190°C. As soon as 190°C. was reached, the polymer was discharged. The resin obtained had a softening point of 88°C. (B and R), color 1 to 2 (Hellige scale).

EXAMPLE 11

The procedure of Example 9 was repeated using one mole of Nopol, one mole of trimethylolpropane and 2 moles of toluene diisocyanate to obtain a urethane resin.

EXAMPLE 12

The procedure of Example 9 was repeated using one mole of Nopol, 3 moles of trimethylolpropane and 5 moles of toluene diisocyanate to form a urethane resin.

EXAMPLE 13

All of the above resins were then employed to make hot melt adhesive formulations having good gloss and adhesive strength as tested in paper-to-paper adhesion. The formulations employed were as follows:

|  | A | B | C | D | E |
|---|---|---|---|---|---|
| Paraffin wax | 60 | 50 | 40 | 40 | 60 |
| Microcrystalline wax | 10 | 10 | 10 | 5 | 5 |
| Elvax 260 | 20 | 20 | 20 | 10 | 5 |
| Terpene-urethane resin of Example 1 | 10 | 20 | 30 | 45 | 30 |

Satisfactory hot melt adhesive formulations in Example 13 A, B, C, D and E also were obtained when the terpene-urethane resin of Example 1 was replaced in turn by the terpene-urethane resins prepared in each of Example 2, Example 3, Example 4, Example 5, Example 6, Example 7, Example 8, Example 9, Example 10, Example 11 and Example 12.

EXAMPLE 14

A hot melt adhesive formulation was made from 60 parts of paraffin wax, 10 parts microcrystalline wax and 30 parts of the terpene-urethane resin of Example 1.

EXAMPLE 15

A hot melt adhesive formulation was made from 70 parts of paraffin wax and 30 parts of the terpene-urethane resin of Example 1.

EXAMPLE 16

A hot melt adhesive formulation was made from 70 parts of microcrystalline wax and 30 parts of the terpene-urethane resin of Example 1.

The following formulations also made satisfactory hot melt adhesive formulations:

| Paraffin wax | 50 | 30 | 10 |
|---|---|---|---|
| Microcrystalline wax | 20 | 40 | 60 |
| Terpene-urethane resin of Example 1 | 30 | 30 | 30 |

EXAMPLE 17

60 parts of paraffin wax (Sun 4412) and 10 parts of microcrystalline wax (Sun 5825) were melted at 80 to 100° C. and then 10 parts of Elvax 260 were added to give a wax master batch. Then there were added 20 parts of the terpene-urethane resin prepared in Example 10. This formulation is called hereinafter Formulation A.

Similar foundations were prepared replacing the terpene-urethane resin of Example 10 by (a) 20 parts of a commercial polyterpene resin (ST–5125, a beta pinene polymer) and (b) 20 parts of a commercial terpene-phenolic resin (SP–560).

The addition of the terpene-urethane resin of Example 10 did not add any color to the wax batch. The hot melt coating or adhesive prepared (Formulation A) exhibited water-white color.

Upon heating at 250° F. for 2 to 4 hours, Formulation A discolored very slightly, but less than when the terpene-polyurethane resin was replaced by 20 parts of ST–5125, a polyterpene resin used in commercial hot melt coatings.

Wax films were hot coated on paper and upon cooling subjected to gloss determination with the 60° Gardner Portable Glossmeter. For the wax master batch the gloss was less than 50. With 20 parts of ST-5125 polyterpene resin the gloss was 55 to 60. With Formulation A the gloss was 65 to 70.

Adhesion was determined in a shear strength test. The hot melt wax compositions were applied on paper strips (3 mils film thickness) using paper stock .024 "Enamel Cote" from West Virginia Pulp and Paper Company. One coated strip and one uncoated strip were heat sealed on a hot plate at 250° F. for 5 seconds at 327 grams per square inch pressure. Then the sealed paper strips were pulled apart on a Tinius-Olsen machine at 2 inches per minute at 125° F. The following results were obtained:

Wax master batch with ST-5125 polyterpene
  resin _____p.s.i__ 40-45
Wax master batch with SP-560 terpene-phenolic resin _____p.s.i__ 45-50
Formulation A _____p.s.i__ 55-60
Wax master batch without any resin _____ falls apart
Wax master batch without resin (room temperature) _____p.s.i__ 20

EXAMPLE 18

A hot melt coating composition was made from 35 parts paraffin wax, 5 parts microcrystalline wax, 10 parts Elvax 260 and 50 parts of the terpene-urethane resin of Example 1.

EXAMPLE 19

A hot melt coating was made from 40 parts of paraffin wax, 10 parts microcrystalline wax, 30 parts of Elvax 260 and 20 parts of the terpene-urethane resin of Example 1.

We claim:

1. A hot melt adhesive composition comprising 40 to 95% of a member of the group consisting of paraffin wax and microcrystalline wax, 5 to 50% of the reaction product of an organic polyisocyanate and terpene alcohol in an equivalent ratio of from 10:1 to 1:5 and 5 to 35% of an ethylene-vinyl acetate copolymer containing 10 to 60% vinyl acetate.

2. A composition according to claim 1 wherein the terpene alcohol is a monocyclic terpene alcohol.

3. A composition according to claim 1 wherein the terpene alcohol is a bicyclic terpene alcohol.

4. A composition according to claim 1 wherein the terpene alcohol is a tricyclic diterpene alcohol.

5. A composition according to claim 4 wherein the terpene alcohol is selected from the group consisting of abietyl alcohol, dihydroabietyl alcohol, tetrahydroabietyl alcohol, and dehydroabietyl alcohol.

6. A composition according to claim 1 including both paraffin wax and microcrystalline wax.

7. A composition according to claim 6 wherein the terpene alcohol is selected from the group consisting of abietyl alcohol, dihydroabietyl alcohol, tetrahydroabietyl alcohol and dehydroabietyl alcohol.

8. A composition according to claim 7 wherein the organic polyisocyanate is an aromatic polyisocyanate.

9. A composition according to claim 8 wherein the aromatic polyisocyanate is toluene diisocyanate.

10. A composition according to claim 1 wherein the terpene alcohol is replaced in part by a polyhydric alcohol.

11. A composition according to claim 10 wherein the polyhydric alcohol contains up to 90% of the total alcohol groups and the terpene alcohol contains at least 10% of the total alcohol groups.

12. A composition according to claim 11 wherein the terpene alcohol is selected from the group consisting of abietyl alcohol, dihydroabietyl alcohol, tetrahydroabietyl alcohol, and dehydroabietyl alcohol.

13. A composition according to claim 1 wherein the total number of alcohol groups available equals the number of isocyanate groups.

14. Paper adhered together by the composition of claim 1.

15. Paper coated with the composition of claim 1.

16. A composition according to claim 1 wherein the polyisocyanate and terpene alcohol reaction product is 10 to 45% of the composition, the wax is 45 to 70% of the composition and the thylene-vinyl acetate copolymer is 5 to 35% of the composition.

17. A composition according to claim 1 wherein the ethylene-vinyl acetate copolymer has between 17 and 42% vinyl acetate.

References Cited

UNITED STATES PATENTS

| | | | |
|---|---|---|---|
| 2,867,644 | 1/1959 | Leclercq et al. | 260—24 |
| 2,926,148 | 2/1960 | Leclercq et al. | 260—24 |
| 3,171,825 | 3/1965 | Mark | 260—28 |
| 3,236,816 | 2/1966 | Caldwell et al. | 260—77.5 |

DONALD E. CZAJA, Primary Examiner

WILLIAM E. PARKER, Assistant Examiner

U.S. Cl. X.R.

117—155; 161—190, 250; 260—28, 28.5